(12) United States Patent
Bailey et al.

(10) Patent No.: US 8,683,026 B2
(45) Date of Patent: Mar. 25, 2014

(54) FRAMEWORK PROVIDING UNIFIED INFRASTRUCTURE MANAGEMENT FOR POLYMORPHIC INFORMATION TECHNOLOGY (IT) FUNCTIONS ACROSS DISPARATE GROUPS IN A CLOUD COMPUTING ENVIRONMENT

(75) Inventors: Bret A. Bailey, Flower Mound, TX (US); Gary L. Detro, Celina, TX (US); Leonard S. Hand, Red Creek, NY (US); Michael S. Jones, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 12/963,018

(22) Filed: Dec. 8, 2010

(65) Prior Publication Data
US 2012/0151025 A1 Jun. 14, 2012

(51) Int. Cl.
*G06F 15/173* (2006.01)
*G06F 15/16* (2006.01)

(52) U.S. Cl.
USPC .......................... 709/223; 709/203; 709/224

(58) Field of Classification Search
USPC ........................................ 709/203, 223–224
See application file for complete search history.

(56) References Cited

U.S. PATENT DOCUMENTS

| 7,574,496 | B2 | 8/2009 | McCrory et al. |
| 7,752,171 | B2 | 7/2010 | De Spiegeleer |
| 2006/0230076 | A1 | 10/2006 | Gounares et al. |
| 2009/0254572 | A1* | 10/2009 | Redlich et al. .................. 707/10 |
| 2010/0042720 | A1 | 2/2010 | Stienhans et al. |
| 2010/0179944 | A1 | 7/2010 | Anand et al. |
| 2010/0250497 | A1* | 9/2010 | Redlich et al. ................ 707/661 |

* cited by examiner

*Primary Examiner* — Minh-Chau Nguyen
(74) *Attorney, Agent, or Firm* — Patents on Demand P.A.; Brian K. Buchheit; Scott M. Garrett (57) ABSTRACT

Performance of polymorphic IT functions in a cloud computing environment can begin by providing an individualized selection mechanism for initiating polymorphic IT functions upon a node of a cloud computing environment. A polymorphic IT function can represent an IT function where the actions required to perform the IT function vary depending upon a combination of configuration parameters for the node. User-specification of the combination of configuration parameters can be rendered unnecessary by the individualized selection mechanism. A polymorphic IT function framework can receive a request identifying the node and a driver program via the individualized selection mechanism to perform a user-selected polymorphic IT function. The driver program can define actions for performing the polymorphic IT function upon the node for the combination of configuration parameters. The driver program can then be invoked. Upon completion of the driver program, notification can be sent to a designated entity.

20 Claims, 6 Drawing Sheets

| BAR Utility GUI 500 | | | |
|---|---|---|---|
| Nodelist (Manage) 505 | | 526  528 | 510 |
| Server Name 522 | BAR Driver 524 | Sector | Actions |
| [checker] | [BAR_zSeries_flash] | Odimgmt | |
| [checker] | [BAR_zSeries_tsm] | Odimgmt | |
| [gdiMgmt_ESSmgr] | [BAR_GREEN_xSeries_tsmvcb] | Storage | |
| [gdiMgmt_ESSmgr] | [BAR_GREEN_xSeries_tsmvcb] | Odimgmt | |
| [gdiMgmt_SANSurfer] | [BAR_GREEN_xSeries_tsmvcb] | Odimgmt | |
| [gdiMgmt_SANSurfer] | [BAR_RED_xSeries_tsmvcb] | Odimgmt | |
| [gdimmbus] | [BAR_pSeries_mksys] | IS_Dev | |

Sample Node List 550

<IP Address>, <Name>, <Driver_Name>, <Sector>, <email> 555

172.16.55.211, WAS_01, BAR_GREEN_xSeries_tsmvcb, Storage, <email>

172.16.55.222, WAS_02, BAR_GREEN_xSeries_tsmvcb, Odimgmt, <email>

172.16.55.221, Portal_01, BAR_RED_xSeries_tsmvcb, Odimgmt, <email>

172.16.55.161, Test_02, BAR_GREEN_xSeries_tsmvcb, Odimgmt, <email>

172.16.55.170, DB_Host, BAR_pSeries_mksysb, Odimgmt, <email>

172.16.55.159, zGuest_WAS, BAR_zSeries_flash, Odimgmt, <email>

FRAMEWORK PROVIDING UNIFIED INFRASTRUCTURE MANAGEMENT FOR POLYMORPHIC INFORMATION TECHNOLOGY (IT) FUNCTIONS ACROSS DISPARATE GROUPS IN A CLOUD COMPUTING ENVIRONMENT

BACKGROUND

The present invention relates to the field of cloud computing and, more particularly, to a framework providing a unified interface for polymorphic IT functions in a cloud computing environment.

The cloud computing service model has shifted how many network or IT functions are performed. Not only are businesses able to purchase access to tailored computing resources, but many of the key processes or functions (e.g., data backups, system restores, optimization, etc.) that were once the domain of system administrators are now services available to end-users.

In a cloud computing environment, the provisioning of servers is often hosted across several platforms (i.e., mainframe, UNIX, INTEL) and virtualized to support multiple operating systems. The underlying infrastructure of the cloud computing environment is generally hidden from the user; software applications utilized by the user have the same "look and feel" regardless of the actual hardware.

However, the differences in the underlying infrastructure hosting the application or system does influence how functions like backup, archive and restore (BAR) tasks are performed. That is, the steps and/or applications required to execute a BAR task on a UNIX-based server differ from those required to perform the same task on an INTEL-based server, and both differ from those used when performing the same task on a mainframe.

These complexities have impeded the ability to provide key functions like BAR using a unified approach within a cloud computing environment; the simplicity required for a successful self-service utility is countermanded by the complexity of the cloud computing environment.

Current approaches to this problem compromise one or more beneficial aspects of the cloud environment. One approach is a return to automated scheduled processes of traditional network BAR functions by an administrator; eliminating self-service and on-demand capabilities. Alternately, all users could be required to maintain proficiency in the necessary applications as well as understand how to find the target server and/or instance within the cloud; allowing self-service at the cost of ease-of-use.

Further, these conventional approaches place artificial restrictions upon the cloud computing environment, limiting the incorporation of new technology.

BRIEF SUMMARY

One aspect of the present invention can include a method for performing IT functions in a cloud computing environment in a polymorphic manner. Such a method can begin by providing an individualized selection mechanism for initiating IT functions upon a node of a cloud computing environment. A polymorphic IT function can represent any IT function where the actions required to perform this function vary depending upon a combination of configuration parameters for the node. A polymorphic IT function refers to any function that has been abstracted in such a way to allow invocation without regards to implementation. User-specification of the combination of configuration parameters can be rendered unnecessary by the individualized selection mechanism, which can require a single selection action. A polymorphic IT function framework can then receive a request via the individualized selection mechanism to perform a user-selected polymorphic IT function. The request can include identifiers for the node and a driver program. The driver program can define actions for performing the user-selected polymorphic IT function upon the node for a specific combination of configuration parameters. The driver program can be invoked to perform the requested polymorphic IT function. Upon completion of the driver program, notification can be sent to a designated entity that the polymorphic IT function has been performed.

Another aspect of the present invention can include a system for performing polymorphic IT functions in a cloud computing environment. Such a system can include a cloud computing environment, driver packages, and a user interface. The cloud computing environment can include multiple nodes configured to operate in accordance with a cloud computing model. The driver packages can each be configured to perform a specific polymorphic IT function on a specific node of the cloud computing environment. A polymorphic IT function can represent an IT function where actions required to perform the IT function vary depending upon a specific combination of configuration parameters for the specific node. The user interface can be configured to provide an individualized selection mechanism to initiate requests to execute a driver package for the specific polymorphic IT function upon the specific node. User-specification of the combination of configuration parameters can be rendered unnecessary by the individualized selection mechanism, which can require a single selection action.

Yet another aspect of the present invention can include a computer program product that includes a computer readable storage medium having embedded computer usable program code. The computer usable program code can be configured to provide an individualized selection mechanism for initiating polymorphic IT functions upon a node of a cloud computing environment. A polymorphic IT function can represent an IT function where actions required to perform the IT function vary depending upon a combination of configuration parameters for the node. User-specification of the combination of configuration parameters can be rendered unnecessary by the individualized selection mechanism, which can require a single selection action. The computer usable program code can be configured to receive a request via the individualized selection mechanism to perform a user-selected polymorphic IT function. The request can include identifiers for the node and a driver program. The driver program can define actions for performing the user-selected polymorphic IT function upon the node for a specific combination of configuration parameters. The computer usable program code can be configured to invoke the driver program to perform the requested polymorphic IT function. Then, the computer usable program code can be configured to, upon completion of the driver program, send notification to a designated entity that the polymorphic IT function has been performed.

DETAILED DESCRIPTION

The present invention discloses a solution for a framework that provides an easy-to-use self-service approach for polymorphic IT functions (e.g., backup, archive, restore, etc.) within a cloud computing environment. This framework can utilize a function-driver configuration to provide "one-click" functionality for IT functions that would typically require in-depth knowledge of the underlying function and configuration of the cloud computing environment. The specific details for performing the polymorphic IT function can be abstracted into a driver that is invoked by the user. This layer of abstraction not only simplifies performance of the functions by the user, but can provide a cohesive high-level overview of the cloud computing environment, regardless of the underlying network configuration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction handling system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction handling system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
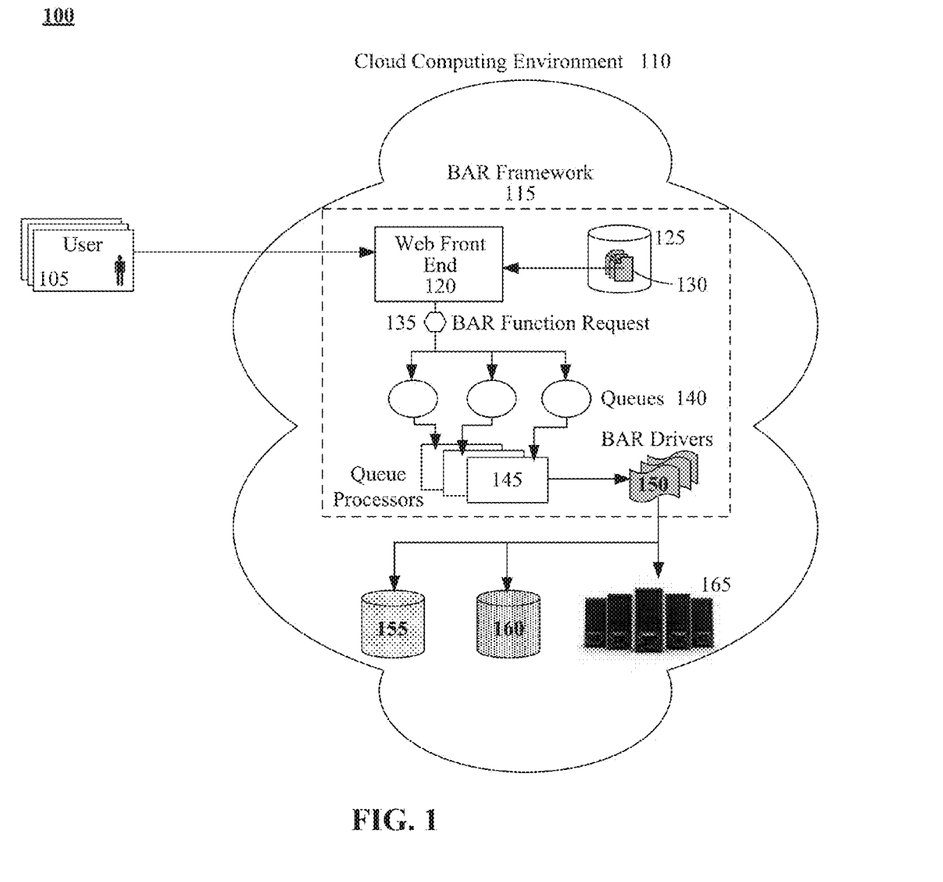
FIG. 1 is an illustration of a process flow detailing a high-level overview of a framework for a cloud computing environment that provides a unified infrastructure management for polymorphic information technology (IT) functions in accordance with embodiments of the inventive arrangements disclosed herein.

FIG. 1 is an illustration of a process flow 100 detailing a high-level overview of a framework 115 for a cloud computing environment 110 that provides a unified infrastructure management for polymorphic information technology (IT) functions in accordance with embodiments of the inventive arrangements disclosed herein.

As used herein, the term "polymorphic IT function" can refer to an information technology (IT) operation or function whose performance takes on different forms based upon the hardware and/or software upon which the operation or function is being performed. For example, the process of creating a system backup can vary depending on the type of platform (e.g., mainframe, INTEL, UNIX) running the system.

Examples of polymorphic IT functions can include, but are not limited to, backup/archive and recovery (BAR) functions, server/process optimization functions, security functions, and the like. Typical BAR functions have been used for illustrative purposes in this example and other subsequent Figures; hence, details regarding the BAR framework 115 of process flow 100 and/or the framework described in subsequent Figures can be expanded upon to other polymorphic IT functions.

In process flow 100, a user 105 can initiate the performance of a BAR function via a Web front end 120 of the BAR framework 115. The BAR framework 115 can represent a configuration of hardware and/or software components within the cloud computing environment 110 configured to simplify the ability for the user 105 to perform polymorphic IT functions, backup/archive/recovery (BAR), in this example.

The cloud computing environment 110 can represent a hardware/software computing environment configured in accordance with the cloud computing model. The cloud computing environment 110 can enable on-demand access to a shared pool of configurable computing resources. A cloud computing environment 110 can be realized as a protected cloud (i.e., owned by a sole organization), a community cloud (i.e., shared by multiple sympathetic organizations), a public cloud (i.e., available to the public or a large group), or a hybrid cloud (i.e., a configuration of multiple cloud types).

Thus, it should be emphasized that in a conventional cloud computing environment 110 (i.e., without a BAR framework 115), the user 105 cannot perform a polymorphic IT function like a backup without knowing the network location of the physical machine hosting the system within the cloud computing environment 110, the native platform of the physical machine, the platform in which the system operates (i.e., a virtualized UNIX environment running on an INTEL-based machine), what software tools are required to perform the task under those conditions, and if they have the proper security privileges to perform the operation. This situation gravely detracts from the simplicity and self-service focus embodied by the cloud computing environment 110.

The Web front end 120 can represent the graphical user interface (GUI) by which the user 105 can initiate a BAR function request 135. The design and functionality of the Web front end 120 can be defined within one or more source files 130 residing within a data store 120.

The BAR function request 135 can represent an electronic message internal to the BAR framework 115 that can contain pertinent information for performing the BAR function selected by the user 105. For example, the BAR function request 135 can include the action to be performed, the server it is to be performed on, the system it is to be performed for, the BAR driver 150 to be used, and so on.

As in a typical cloud computing environment 110, the BAR function request 135 (i.e., service request) can be placed in a queue 140 for processing. A queue 140 can represent a holding area for requests prior to their performance within the cloud computing environment 110. Logic within the BAR framework 115 and/or Web front end 120 can direct the BAR function request 135 to the appropriate queue 140.

From the queue 140, the BAR function request 135 can proceed to the queue processor 145. In a typical cloud computing environment 110, the queue processor 145 executes the steps necessary to fulfill the service request. However, within the BAR framework 115, the queue processor 145 can be configured to invoked a BAR driver 150 that corresponds to the requested function or is contained in the BAR function request 135.

The BAR driver 150 can, abstractly, represent everything that the user 105 would need to know should they have had to perform the function manually. That is, the BAR driver 150 driver "knows" how to perform the requested BAR function for the server.

Thus, the BAR driver 150 performs the necessary steps, invoking additional software applications, services, or processes, as necessary. Depending upon the BAR function being performed, the BAR driver 150 can ensure that the data is packaged properly and stored in the appropriate storage area—backup data store 155, archive data store 160 and/or data center 165.

It should be noted that the function-driver structure of the BAR framework 115 can allow new BAR drivers 150 to be added to the BAR framework 115 without requiring the user 105 to learn additional tools and without disruption to operation.

Cloud computing environment 110 can include any hardware/software/and firmware necessary to convey data encoded within carrier waves. Data can be contained within analog or digital signals and conveyed though data or voice channels. Cloud computing environment 110 can include local components and data pathways necessary for communications to be exchanged among computing device components and between integrated device components and peripheral devices. Cloud computing environment 110 can also include network equipment, such as routers, data lines, hubs, and intermediary servers which together form a data network, such as the Internet. Cloud computing environment 110 can also include circuit-based communication components and mobile communication components, such as telephony switches, modems, cellular communication towers, and the like. Cloud computing environment 110 can include line based and/or wireless communication pathways.

As used herein, presented data stores 125, 155, and 160 and data center 165 can be a physical or virtual storage space configured to store digital information. Data stores 125, 155, and 160 and data center 165 can be physically implemented within any type of hardware including, but not limited to, a magnetic disk, an optical disk, a semiconductor memory, a digitally encoded plastic memory, a holographic memory, or any other recording medium. Data stores 125, 155, and 160 and data center 165 can be stand-alone storage units as well as a storage unit formed from a plurality of physical devices. Additionally, information can be stored within data stores 125, 155, and 160 and data center 165 in a variety of manners. For example, information can be stored within a database structure or can be stored within one or more files of a file storage system, where each file may or may not be indexed for information searching purposes. Further, data stores 125, 155, and/or 160 and/or data center 165 can utilize one or more encryption mechanisms to protect stored information from unauthorized access.

Figure 2:
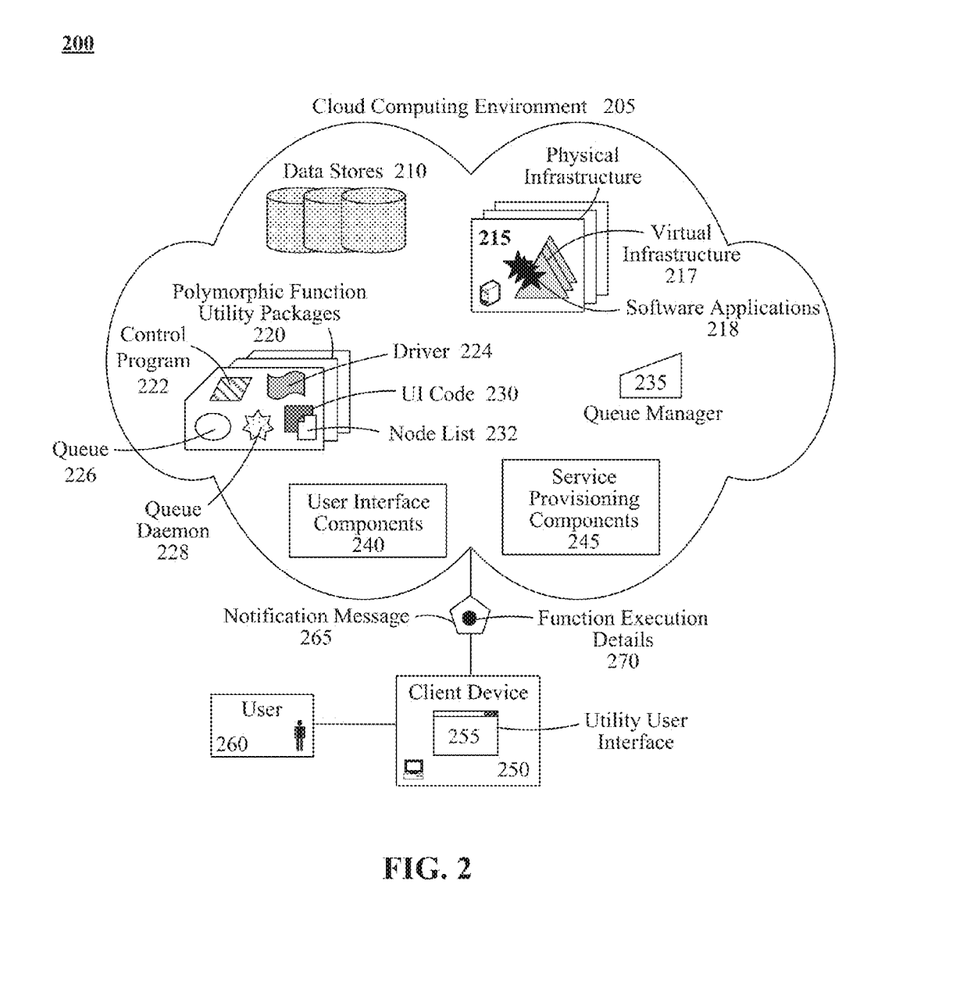
FIG. 2 is a schematic diagram illustrating a system for utilizing a polymorphic framework in a cloud computing environment in accordance with an embodiment of the inventive arrangements disclosed herein.

FIG. 2 is a schematic diagram illustrating a system 200 for utilizing a polymorphic framework in a cloud computing environment 205 in accordance with embodiments of the inventive arrangements disclosed herein. System 200 can represent a functional embodiment for process flow 100 of FIG. 1.

In system 200, a user 260 can utilize a utility user interface 255 to perform polymorphic IT functions within the cloud computing environment 205. The user 260 can access the utility user interface 255 from a client device 250.

The client device 250 can represent a variety of computing devices capable of running the utility user interface 255 and communicating with the cloud computing environment 205. The utility user interface 255 can represent a graphical user interface (GUI) in which the user 260 can be presented with a "one-click" means for performing polymorphic IT functions within the cloud computing environment 205.

The cloud computing environment 205 can represent a configuration of hardware/software components implementing cloud computing models as well as the framework allowing a "one-click" approach for user 260 performance of polymorphic IT functions.

It should be noted that the framework, such as the BAR framework 115 of process flow 100, that allows the user 260 to perform polymorphic IT functions can utilize a variety of computing resources contained within the cloud computing environment 205. Therefore, the framework can utilize various fundamental elements of the cloud computing environment 205, as needed. Since the framework does not refer to a single hardware or software component, but an orchestration of components, the framework can be represented by the cloud computing environment 205 shown in system 200, unlike the dashed rectangular representing the BAR framework 115 in process flow 100.

It is also important to note that, since a cloud computing environment 205 is based on the INTERNET, any computer networks (e.g., WAN, LAN, etc.) required for communication between the various components of system 200 can be included as part of the cloud computing environment 205 and not illustrated as separate entities.

To support the framework, the cloud computing environment 205 can include elements common to most cloud computing architectures—data stores 210, physical infrastructure 215, user interface components 240, and service provisioning components 245—as well as those specific for the polymorphic IT function framework—the polymorphic function utility packages 220 and queue manager 235.

Data stores 210 can represent the various storage facilities (e.g., hard drive memory, databases, data centers, storage area network (SAN), etc.) available for data within the cloud computing environment 205. In another contemplated embodiment, data stores 210 can represent a cloud storage service provided by a third-party like AMAZON SIMPLE STORAGE SERVICE (S3).

The physical infrastructure 215 can represent the hardware components (e.g., servers, routers, computers, etc.) that provide the backbone of the cloud computing environment 205 and run the various software applications 218 required for operation. Most elements of the cloud computing environment 205 operate with relation to one or more components of the physical infrastructure 215. For example, a database 210 is often associated with a specific data server 215.

Additionally, the physical infrastructure 215 can run specialized software for hosting virtual infrastructure 217. The virtual infrastructure 217 can represent instances of simulated computing environments (i.e., a virtual machine). Virtual infrastructure 217 can also run the various software applications 218 of the cloud computing environment 205.

A software application 218 can represent a specific computer program. With respect to the polymorphic function framework, the software applications 218 of system 200 can represent the additional computer programs that may be required or invoked to perform the specific polymorphic IT function.

The user interface components 240 can represent the functional elements required to support operation for the user interfaces, such as the utility user interface 255, that interact with the cloud computing environment 205. Examples of user interface components 240 can include, but are not limited to, Web pages, Web applications, scripts, Web servers, and the like.

The service provisioning components 245 can represent the functional elements that can be called upon to provide a requested service like access to specific software application 218. It should be emphasized that the service provisioning components 245 can provide services typically available in a cloud computing environment 205, and, although the services of service provisioning components 245 can be utilized in the performance of a polymorphic IT function, the service provisioning components 245 cannot perform a polymorphic IT function directly through the utility user interface 255.

The heart of the polymorphic IT function framework can be represented by the polymorphic function utility packages 220. A polymorphic function utility package 220 can represent a logical grouping of elements that implement the polymorphic IT function framework.

It should be noted that elements presented within the polymorphic function utility package 220 can be dispersed within the cloud computing environment 205 and may be reused for multiple polymorphic function utility packages 220. For example, the UI code 230 can be stored with the user interface components 240 and can be used by multiple polymorphic function utility packages 220 as the basis for the utility user interface 255.

The polymorphic function utility package 220 can include a control program 222, a driver 224, a queue 226, a queue daemon 228, and user interface (UI) code 230. The driver 224 can represent the actions required to perform the selected function on the specified system. Each combination of function and system can be represented by a separate driver 224.

For example, the driver 224, "zSeries_flash.backup", can define the actions to perform a flash backup function on a zSeries device 215; the driver 224, "zSeries_tsm.backup", can define the performance of a Tivoli Storage Manager backup function on the zSeries device 215.

The control program 222 can control the workflow for each action of the driver 224. During operation, the control program 222 can be required to interact with other service provisioning components 245 and/or software applications 218 of the cloud computing environment 205.

The queue daemon 228 can represent the software element that manages the queue 226 for the driver 224. The queue 226 can represent the holding area for instances of the driver 224 that have been requested, but not yet performed. A one-to-one relationship can exist between the queue 226 and the queue daemon 228 and the driver 224.

In another embodiment, the queue daemon 228 and/or queue 226 can reside within the queue manager 235.

The queue manager 235 can represent the software component that handles the active queue daemons 228. As such, the queue manager 235 can perform operations like queries upon the queue daemons 228 to determine which queue daemons 228, and, therefore, drivers 224 are currently active.

The UI code 230, as previously mentioned, can represent the source of the utility user interface 255. The UI code 230 can be written using a standardized Web programming language supported by the client device 250 and capable of communicating with the other components of the cloud computing environment 205.

The UI code 230 can utilize a node list 232 when presenting data within the utility user interface 255. The node list 232 can define the servers (real or virtual), also called nodes, of the cloud computing environment 205 that user 260 can perform polymorphic IT functions upon. The utility user interface 255 can include functionality for the management of the node list 232.

As the actions for the polymorphic IT function are performed, the driver 224 can record function details 270. These function details 270 can represent feedback for the performance of each action.

For example, the function details 270 can include the text of confirmation messages from other software applications 218 or processes as well as any problems encountered.

The function details 270 can be sent to the user 260 as part of a notification message 265. The notification message 265 can be sent to the user 260 upon completion (successful or otherwise) of the requested polymorphic IT function.

Cloud computing environment 205 can include any hardware/software/and firmware necessary to convey data encoded within carrier waves. Data can be contained within analog or digital signals and conveyed though data or voice channels. Cloud computing environment 205 can include local components and data pathways necessary for communications to be exchanged among computing device components and between integrated device components and peripheral devices. Cloud computing environment 205 can also include network equipment, such as routers, data lines, hubs, and intermediary servers which together form a data network, such as the Internet. Cloud computing environment 205 can also include circuit-based communication components and mobile communication components, such as telephony switches, modems, cellular communication towers, and the like. Cloud computing environment 205 can include line based and/or wireless communication pathways.

As used herein, presented data stores 210 can be a physical or virtual storage space configured to store digital information. Data stores 210 can be physically implemented within any type of hardware including, but not limited to, a magnetic disk, an optical disk, a semiconductor memory, a digitally encoded plastic memory, a holographic memory, or any other recording medium. Data stores 210 can be stand-alone storage units as well as a storage unit formed from a plurality of physical devices. Additionally, information can be stored within data stores 210 in a variety of manners. For example, information can be stored within a database structure or can be stored within one or more files of a file storage system, where each file may or may not be indexed for information searching purposes. Further, data stores 210 can utilize one or more encryption mechanisms to protect stored information from unauthorized access.

Figure 3:
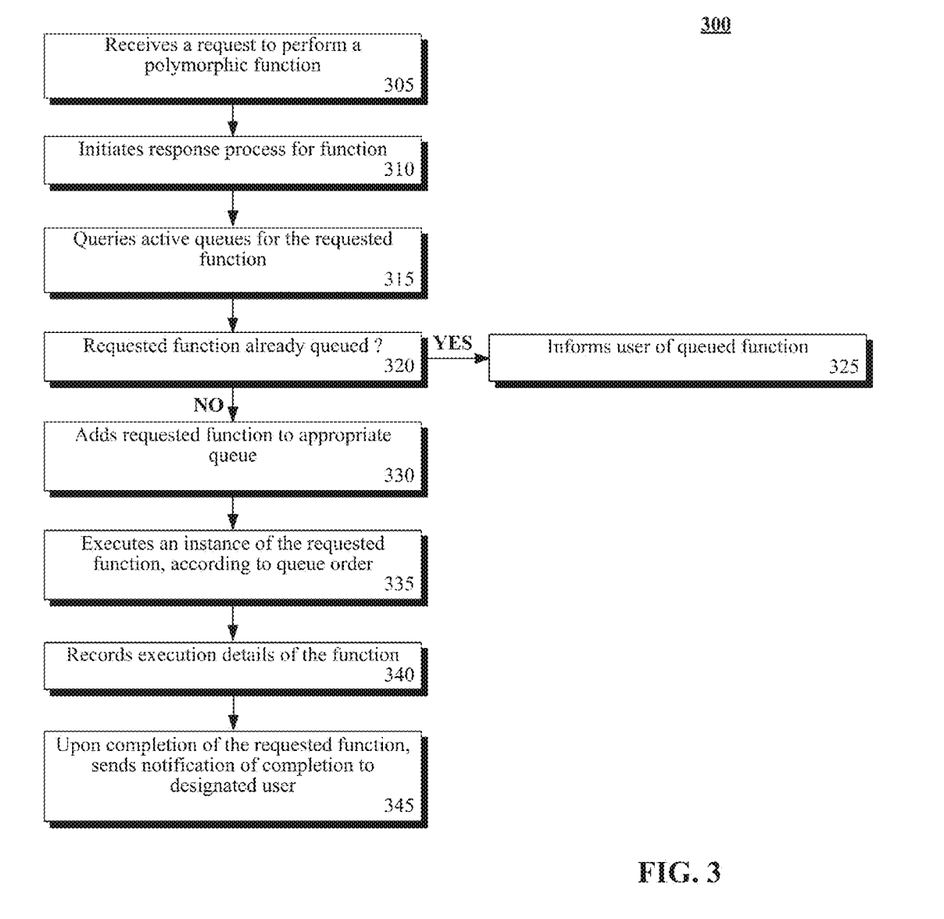
FIG. 3 is a flow chart of a method detailing the performance of a polymorphic IT function using a polymorphic IT function framework in accordance with an embodiment of the inventive arrangements disclosed herein.

FIG. 3 is a flow chart of a method 300 detailing the performance of a polymorphic IT function using a polymorphic IT function framework in accordance with embodiments of the inventive arrangements disclosed herein. Method 300 can be performed using process flow 100 and/or within the context of system 200.

Method 300 can begin in step 305 where the polymorphic IT function framework can receive a request to perform a polymorphic IT function. The corresponding response process for the function can be initiated in step 310. That is, an archive request would trigger an archive process; a load balancing request would trigger a load balancing process, and so on.

In step 315, the active queues can be queried for the requested function. It can be determined if the requested function is already queued in step 320. When the requested function is already queued, step 325 can execute where the user can be informed that the requested function is already queued.

When the requested function is not already queued, the requested function can be added to the appropriate queue in step 330. In step 335, an instance of the requested function can be processed, according to the queue order.

Details for the function can be recorded in step 340. In step 345, upon completion of the requested function, a notification of completion can be sent to a designated user. This notification can include the details recorded in step 340.

Figure 4:
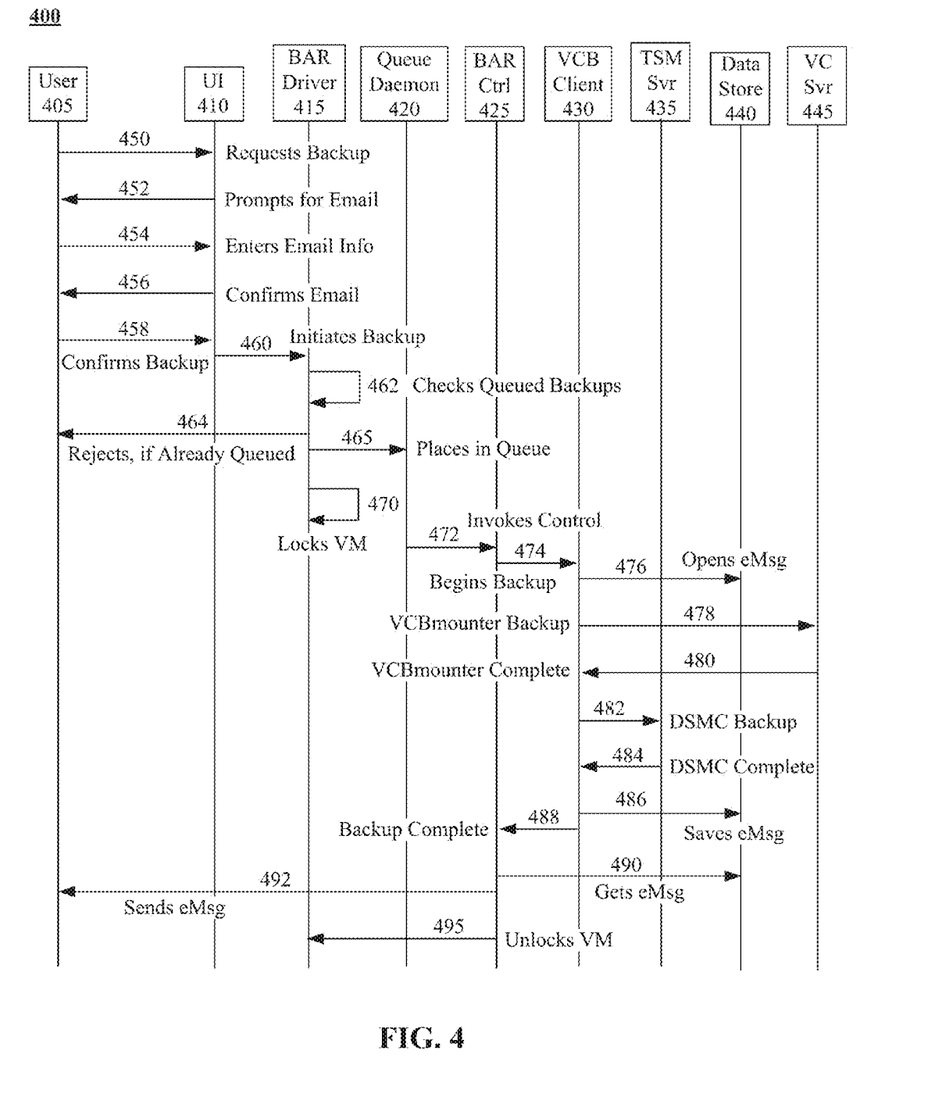
FIG. 4 is a flow diagram detailing interaction between components of a BAR framework to perform a backup function in accordance with embodiments of the inventive arrangements disclosed herein.

FIG. 4 is a flow diagram 400 detailing interaction between components of a BAR framework to perform a backup function in accordance with embodiments of the inventive arrangements disclosed herein. The interactions of flow diagram 400 can represent a specific embodiment of method 300.

In flow diagram 400, a user 405 can perform a backup function utilizing a BAR framework within a cloud computing environment. In this example, the backup function can require use of the TIVOLI STORAGE MANAGER (TSM) and VMWARE CONSOLIDATED BACKUP (VCB).

The user 405 can request 450 performance of the backup function via the user interface 410. The user interface 410 can then prompt 452 the user 405 for email information. The user 405 can enter 454 email information into the user interface 410.

The validity of the entered email information can be confirmed 456 by the user interface 410. Performance of the backup function can then be confirmed 458 by the user 405 within the user interface 410. The user interface 410 can initiate 460 the backup process by invoking the corresponding BAR driver 415.

The BAR driver 415 can check 462 the currently queued backup functions. When the backup function is already queued, then the BAR driver 415 can reject 464 the backup request, informing the user 405.

When the backup function is not already queued, the process can continue with the BAR driver 415 invoking its queue daemon 420 to place 465 the backup request in the queue. When it is time to perform the backup request, the BAR driver 415 can lock 470 the virtual machine associated with the backup request.

The queue daemon 420 can then invoke 472 the BAR control program 425 associated with the BAR driver 415. The BAR control program 425 can communicate with the VCB client 430 to begin 474 the backup.

The VCB client 430 can appropriate space within data store 440 to open 476 an email message. In this example, the VCB client 430 can use the email message to record output/feedback data generated by the backup function.

Next, the VCB client 430 can communicate with the VMWARE VIRTUAL CENTER (VC) server 445 to perform 478 a backup using the "vcbmounter" command. The VC server 445 can indicate 480 to the VCB client 430 that the backup using "vcbmounter" is complete, with any output/feedback/confirmation captured in the open email message.

The VCB client 430 can then communicate 482 with the TSM server 435 to perform a backup using the "dsmc" command. The TSM server 435 can signal 484 the VCB client 430 when the backup is complete. Then, the VCB client 430 can save 486 the email message in the data store 440.

The VCB client 430 can indicate 488 to the BAR control program 425 that the backup function has been completed. The BAR control program 425 can then retrieve 490 the corresponding email message from the data store 440.

The BAR control program 425 can send the retrieved email message to the user 405. Lastly, the BAR control program 425 can unlock 495 the virtual machine, notifying the BAR driver 415 that the backup request has been completed.

Figure 5:
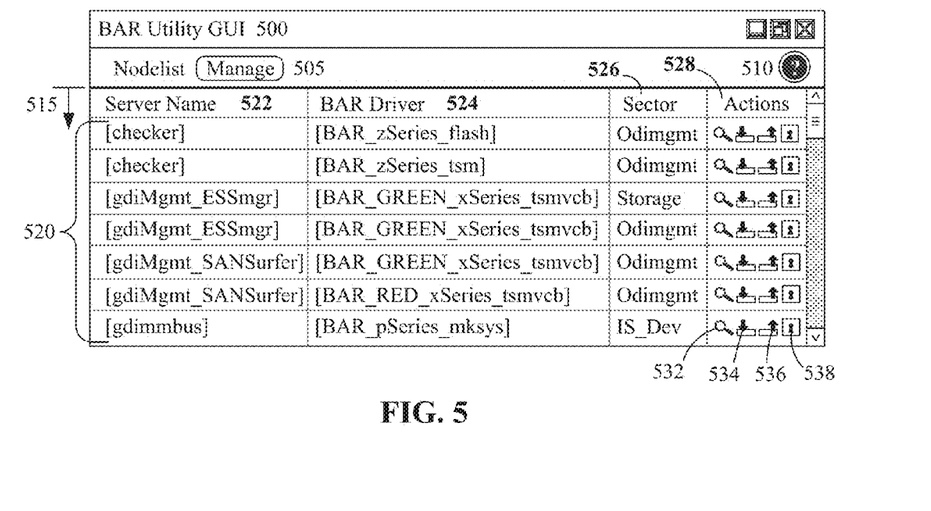
FIG. 5 illustrates an example of a graphical user interface (GUI) to the backup/archive/recovery (BAR) framework in accordance with embodiments of the inventive arrangements disclosed herein.

FIG. 5 illustrates an example of a graphical user interface (GUI) 400 to the backup/archive/recovery (BAR) framework in accordance with embodiments of the inventive arrangements disclosed herein. The BAR utility GUI 500 can be utilized within the context of process flow 100, system 200, method 300, and/or flow diagram 400.

As previously discussed, the BAR utility GUI 500 can represent a Web-based interface between the user and the BAR framework. The BAR utility GUI 500 can include a mechanism, a manage button in this example, for the user to access the underlying node list that relates the servers or nodes with corresponding BAR drivers, as shown in the sample node list 550 of FIG. 5A.

Figure 5A:
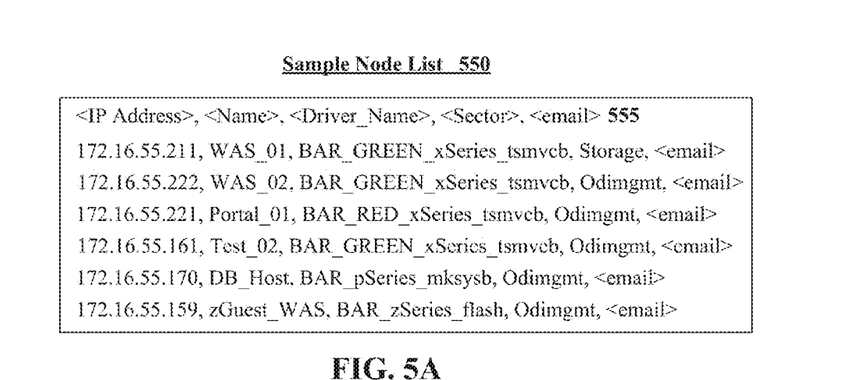
FIG. 5A present a sample of a node list of the BAR framework.

The node list 550 can be standardized, comma-delimited file. As shown in this example, the contents of the node list 550 can follow the format of line 555 with fields for the Internet protocol (IP) address of the server, the name of the server, the name of the BAR driver to use, the sector to which the server belongs, and the email address of the requesting user.

Selection of the manage button 505 by the user can present the node list 550 within a predetermined editing program, provided the user has the proper security privileges. Since the entries of the node list 550 control the performance of BAR functions within the BAR framework, it can be imperative to control access to the manage button 505 within the BAR utility GUI 500.

In addition, the BAR utility GUI 500 can include a help button 510 and a main display area 515. As expected, the help button 510 can provide the user with information regarding the usage of the BAR utility GUI 500.

The main display area 515 can be used to present the contents of the node list 550 to the user. Each entry 520 presented within the main display area 515 can correspond to a node defined in the node list 550. Each entry 520 in the main display area 515 can provide the server name 522, BAR driver name 524, the sector name 526, and actions 528 that can be performed.

The server name 522 can represent either the IP hostname or the VMWARE VIRTUAL CENTER name for the server. The BAR driver name 524 can represent the name of the BAR driver run for a selection action 528. The sector name 526 can be used for the grouping of resources into management realms that are specific to a specific user community.

The actions 528 column can contain selectable icons or buttons representing a query action 532, a backup action 534, a recovery action 536, and an archive action 538. Each action 528 can correspond to a BAR driver having the listed BAR driver name 524 specific to the individual action 532, 534, 536, or 538.

For example, the following can represent the specific BAR drivers that can be invoked to perform the query, backup, restore, and archive actions 532, 534, 536, and 538 for the server having the name 522, "gdiMgmt_ESSmgr", using the BAR driver 524 "BAR_GREEN_xSeries_tsmvcb":

BAR_GREEN_xSeries_tsmvcb.query
BAR_GREEN_xSeries_tsmvcb.backup
BAR_GREEN_xSeries_tsmvcb.restore
BAR_GREEN_xSeries_tsmvcb.archive Thus, selection of the query action 532 can invoke the BAR_GREEN_xSeries_tsmvcb.query driver; the backup action 534 can invoke the BAR_GREEN_xSeries_tsmvcb-.backup driver, and so on.

While the BAR actions 534, 536, and 538 are self-explanatory, the query action 532 can be used to provide the user with pertinent reports about the current state of the BAR framework, as will be discussed in subsequent Figures.

Some items of note regarding the entries 520 presented in the main display area 515. Users of the "checker" server can initiate TSM for a file-level backup or z/VM FLASHCOPY for an image-level backup, each represented by a separate entry 520 since a different BAR driver is used for each.

The entries 520 for the "gdiMgmt_ESSmgr" server can both be associated with the same BAR driver to allow the resource to be viewed by the "Storage" user community as well as "Odimgmt". The "gdiMgmt_SANSurfer" server can have multiple entries because it exists in two different network security zones (red and green), and, therefore, two different BAR drivers.

Thus, the complexities of the cloud computing environment can be demystified to the user without requiring the user to understand the details and differences for performing the polymorphic IT function.

Figure 6:
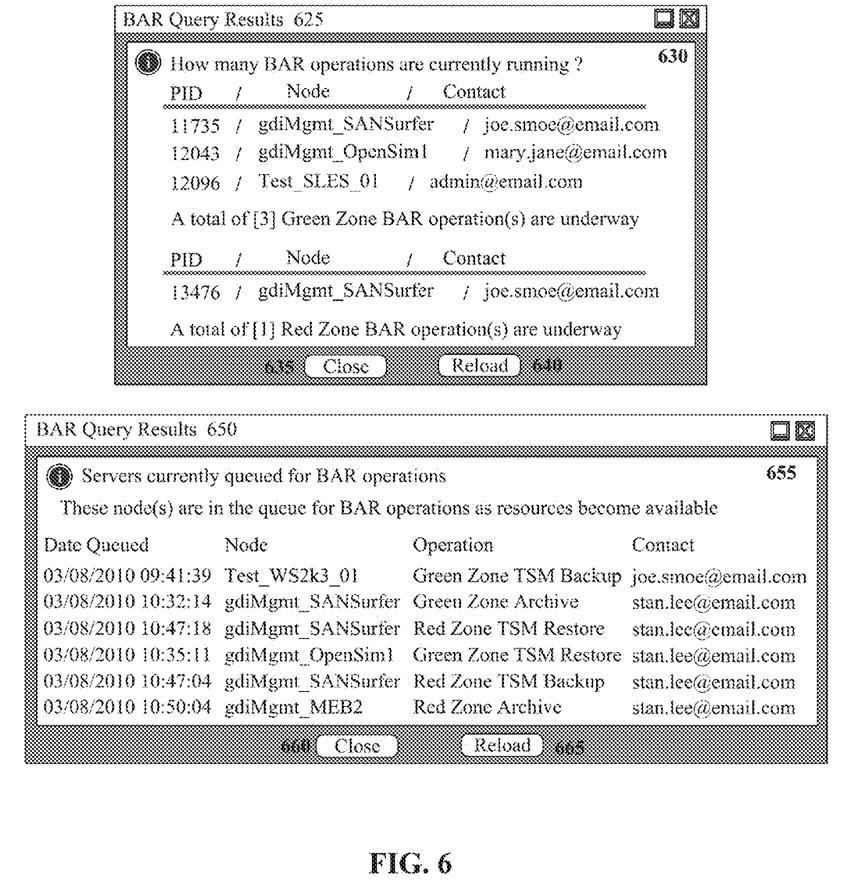
FIG. 6 shows a collection of sample graphical user interfaces (GUIs) and regarding the query function of backup/archive/recovery (BAR) framework in accordance with embodiments of the inventive arrangements disclosed herein.

FIG. 6 shows a collection of sample graphical user interfaces (GUIs) 625 and 650 regarding the query function of backup/archive/recovery (BAR) framework in accordance with embodiments of the inventive arrangements disclosed herein. The GUIs 625 and 650 can be related to the BAR utility GUI 500 of FIG. 5.

A BAR query GUI can represent any GUI presented to the user when selecting the query action 532 from the BAR utility GUI 500 of FIG. 5. It should be noted that a query function is typically not considered a polymorphic IT function or backup/archive/recovery function. However, the inclusion of a query function within the framework for a polymorphic IT function can expand the self-service and user-friendliness of the framework by providing information regarding the current state of functions being performed.

For example, without a query function, a user who simply wants to know if a specific backup function has been queued would have to attempt to queue the backup function and rely upon the framework to check for a queued instance, as discussed in method 300 and flow diagram 400. This course of action can require more time and effort than a simple query of the active queues of the framework, and can lead to inadvertent queuing of functions that the user may not have wanted to queue.

A BAR query GUI can include report options, where the underlying queries for the report options can be written a query language compatible with the technologies utilized in the implementation of the BAR framework and the cloud computing environment. The queries can be written to interface with the queue manager, queue daemons, data stores, and other components of the cloud computing environment to request data.

In this example, the report options can be selected using checkboxes, however, other selection mechanisms (i.e., radio buttons, drop-down list, etc.) supported by the language in which the BAR query GUI is written can be used. Selection of the close mechanism can discard any selection of report options, closing the BAR query GUI and returning to the BAR utility GUI 500 of FIG. 5 (i.e., canceling the query action 532).

After selection of a report option, the query processing mechanism can be used to execute the underlying query and present the results to the user. In this example, selection of the query mechanism can execute selected reports, resulting in BAR query results windows 625 and 650.

BAR query results window 625, "Active Backup, Archive, and Restore Status". The BAR query results window 625 can include a display area 630, a close button 635, and a reload button 640.

The user can select the close button 635 to close the Active BAR Status results window 625, returning the user to the BAR utility GUI 500. Selection of the reload button 640 can refresh the data presented in the display area 630, re-running the underlying query.

The display area 630 can be the portion of the BAR query results window 625 in which the results of the underlying query are presented to the user. Which data fields of the query results to include and the formatting of the data fields can be handled by the corresponding BAR driver.

As shown in this example, the results presented in the display area 630 for the report option 610, "currently running BAR operations", can list the process identifier (PID), node (server) name, and email address of the owner for each BAR function that is currently running in the BAR framework.

In this example, the results can also be separated by network security zone (Green Zone and Red Zone). It should be noted that this view of activity being performed in multiple network security zones can be achieved without the user having to connect to each zone. That is, the query functionality of the BAR framework can provide the user with a high-level overview of IT functions across the entirety of the cloud computing environment without the user having to understand and/or navigate the underlying network configuration.

BAR query queue results window 650 displays the "queued servers". Like BAR query results window 625, BAR query results window 650 can also include a display area 655, a close button 660, and a reload button 665.

The user can select the close button 660 to close the BAR query results window 650, returning the user to either the BAR query GUI 605 or BAR utility GUI 500. Selection of the reload button 665 can refresh the data presented in the display area 655, re-running the underlying query.

The display area 655 can be the portion of the BAR query results window 650 in which the results of the underlying query are presented to the user. Which data fields of the query results to include and the formatting of the data fields can be handled by the corresponding BAR driver.

As shown in this example, the results presented in the display area 655 for the report option 610, "queued servers", can list the date when the operation was queued, node (server) name, the operation to be performed, and the email address of the owner for each BAR function that is currently queued in the BAR framework.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for performing polymorphic IT functions in a cloud computing environment comprising:
    a computing device providing of an individualized selection mechanism for initiating polymorphic IT functions upon a node of a cloud computing environment, wherein a polymorphic IT function represents an IT function where actions required to perform the IT function vary depending upon a combination of configuration parameters for the node, and, wherein user-specification of the combination of configuration parameters are rendered unnecessary by the individualized selection mechanism, wherein use of the individualized selection mechanism requires a single selection action;
    the computing device receiving of a request by a polymorphic IT function framework via the individualized selection mechanism to perform a user-selected polymorphic IT function, wherein said request comprises at least an identifier of the node and an identifier of a driver program, wherein the driver program defines a plurality of actions for performing the user-selected polymorphic IT function upon the node for a specific combination of configuration parameters;
    the computing device invoking said driver program to perform the requested polymorphic IT function; and
    upon completion of the driver program, the computing device sending notification to a designated entity that the polymorphic IT function has been performed.

2. The method of claim 1, wherein the invoking of the driver program further comprises:
    determining an existence of an active queue for the driver program;
    when the active queue for the driver program is non-existent, creating the active queue;
    when the active queue is determined to exist, examining the active queue for a queued request matching the received request; and
    when the received request is unmatched by queued requests, adding the request to the active queue.

3. The method of claim 2, further comprising:
    when the received request matches a queued request, discarding the received request; and
    informing the requesting entity of the match between the received request and the queued request.

4. The method of claim 2, wherein a query function is available for the polymorphic IT function framework, user-selection of said query function further comprises:
    presenting a list of selectable reports within a GUI associated with the polymorphic IT function framework;
    in response to a run command for a selected report, executing a query associated with the selected report upon active queues of the polymorphic IT function framework; and
    displaying results of the query with the GUI.

5. The method of claim 1, wherein the polymorphic IT function comprises at least one of a backup function, an archive function, a restore function, a server optimization function, and a server security function.

6. The method of claim 1, wherein the providing of the individualized selection mechanism further comprises:
  accessing a node list whose entries identify nodes of the cloud computing environment that are able to have polymorphic IT functions performed upon them, wherein each entry defines a unique combination of data field values relating the node identifier with the identifier of the driver program and a logical user grouping associated with the node; and
  presenting the entries of the node list within a graphical user interface (GUI) associated with the polymorphic IT function framework, wherein said GUI supplies the individualized selection mechanism for each entry in the node list.

7. The method of claim 1, wherein the receiving of the request further comprises:
  prompting a requesting entity for an email address;
  validating the email address received in response to the prompting; and
  confirming with the requesting entity the polymorphic IT function and the node for which the request is being made.

8. The method of claim 1, wherein the performance of the requested polymorphic IT function by the driver program utilizes auxiliary software applications available to the cloud computing environment.

9. The method of claim 1, wherein the invoking of the driver program further comprises:
  recording of details for each action performed by the driver program, wherein said record details are included in the notification sent to the designated entity.

10. The method of claim 1, wherein the specific combination of configuration parameters comprises at least a platform type of a physical machine associated with the node, the platform type of a virtual machine associated with the node when the node is virtualized, and a software tool required to perform the requested polymorphic IT function.

11. A system for performing polymorphic IT functions in a cloud computing environment comprising:
  one or more processors;
  a non-transitory storage medium storing program instructions, said one or more processors executing the program instructions;
  a cloud computing environment, which comprise a the one or more processors, comprising a plurality of nodes configured to operate in accordance with a cloud computing model;
  a plurality of driver packages, stored in one or more non-transitory storage mediums, each configured to perform a specific polymorphic IT function on a specific node of the cloud computing environment, wherein a polymorphic IT function is an IT function where actions required to perform the IT function vary depending upon a specific combination of configuration parameters for the specific node; and
  a user interface configured to provide an individualized selection mechanism to initiate requests to execute a driver package for the specific polymorphic IT function upon the specific node, wherein user-specification of the combination of configuration parameters are rendered unnecessary by the individualized selection mechanism, wherein use of the individualized selection mechanism requires a single selection action.

12. The system of claim 11, wherein the driver package further comprises:
  a driver program defining a plurality of actions for performing the specific polymorphic IT function upon the specific node for the specific combination of configuration parameters;
  a control program configured to handle processing of the plurality of actions contained in the driver program within the cloud computing environment;
  a queue for sequentially storing received requests; and
  a queue daemon configured to manage operations for the queue.

13. The system of claim 12, further comprising:
  a queue manager configured to handle instantiation and termination of queue daemons for the plurality of driver packages.

14. The system of claim 11, wherein the user interface is written using a standardized Web programming language supported by the cloud computing environment.

15. The system of claim 11, wherein the polymorphic IT function comprises at least one of a query function, a backup function, an archive function, a restore function, a server optimization function, and a server security function.

16. A computer program product comprising a non-transitory computer readable storage medium having computer usable program code embodied therewith, the computer usable program code comprising:
  computer usable program code configured to provide an individualized selection mechanism for initiating polymorphic IT functions upon a node of a cloud computing environment, wherein a polymorphic IT function represents an IT function where actions required to perform the IT function vary depending upon a combination of configuration parameters for the node, and, wherein user-specification of the combination of configuration parameters are rendered unnecessary by the individualized selection mechanism, wherein use of the individualized selection mechanism requires a single selection action;
  computer usable program code configured to receive a request via the individualized selection mechanism to perform a user-selected polymorphic IT function, wherein said request comprises at least an identifier of the node and an identifier of a driver program, wherein the driver program defines a plurality of actions for performing the user-selected polymorphic IT function upon the node for a specific combination of configuration parameters;
  computer usable program code configured to invoke said driver program to perform the requested polymorphic IT function; and
  computer usable program code configured to, upon completion of the driver program, send notification to a designated entity that the polymorphic IT function has been performed.

17. The computer program product of claim 16, wherein the invoking of the driver program further comprises:
  computer usable program code configured to determine an existence of an active queue for the driver program;
  computer usable program code configured to, when the active queue for the driver program is non-existent, create the active queue;
  computer usable program code configured to, when the active queue is determined to exist, examine the active queue for a queued request matching the received request; and
  computer usable program code configured to, when the received request is unmatched by queued requests, add the request to the active queue.

18. The computer program product of claim 17, further comprising:
- computer usable program code configured to, when the received request matches a queued request, discarding the received request; and
- computer usable program code configured to inform the requesting entity of the match between the received request and the queued request.

19. The computer program product of claim 16, wherein the providing of the individualized selection mechanism further comprises:
- computer usable program code configured to access a node list whose entries identify nodes of the cloud computing environment that are able to have polymorphic IT functions performed upon them, wherein each entry defines a unique combination of data field values relating the node identifier with the identifier of the driver program and a logical user grouping associated with the node; and
- computer usable program code configured to present the entries of the node list within a graphical user interface (GUI), wherein said GUI supplies the individualized selection mechanism for each entry in the node list.

20. The computer program product of claim 16, wherein the polymorphic IT function comprises at least one of a query function, a backup function, an archive function, a restore function, a server optimization function, and a server security function.

* * * * *